United States Patent
Sugiyama et al.

(10) Patent No.: US 8,353,443 B2
(45) Date of Patent: Jan. 15, 2013

(54) DEVICE AND METHOD FOR COOLING RAIL WELD ZONE

(75) Inventors: Seiji Sugiyama, Tokyo (JP); Mitsugu Kajiwara, Tokyo (JP); Kenichi Karimine, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 13/138,760

(22) PCT Filed: Mar. 19, 2010

(86) PCT No.: PCT/JP2010/001997
§ 371 (c)(1),
(2), (4) Date: Sep. 23, 2011

(87) PCT Pub. No.: WO2010/109837
PCT Pub. Date: Sep. 30, 2010

(65) Prior Publication Data
US 2012/0012296 A1      Jan. 19, 2012

(30) Foreign Application Priority Data

Mar. 27, 2009   (JP) ................................. 2009-079938

(51) Int. Cl.
*B23K 31/02*   (2006.01)
(52) U.S. Cl. ............... 228/102; 228/9; 228/46; 228/103
(58) Field of Classification Search .................. None
See application file for complete search history.

(56) References Cited

U.S. PATENT DOCUMENTS

| | | | | |
|---|---|---|---|---|
| 2,824,952 A | * | 2/1958 | Zoethout | 219/137 R |
| 3,184,839 A | * | 5/1965 | Gerlach | 228/125 |
| 4,413,169 A | * | 11/1983 | Cameron | 219/73.1 |
| 4,556,164 A | * | 12/1985 | Oishibashi et al. | 228/199 |
| 4,573,666 A | * | 3/1986 | Nomura et al. | 266/80 |
| 5,183,519 A | * | 2/1993 | Wechselberger et al. | 148/582 |
| 5,195,573 A | * | 3/1993 | Cryderman et al. | 164/476 |
| 5,237,143 A | * | 8/1993 | Scheuchzer | 219/635 |

(Continued)

FOREIGN PATENT DOCUMENTS

JP           48-095337           12/1973

(Continued)

OTHER PUBLICATIONS

International Search Report dated Jun. 22, 2010 issued in corresponding PCT Application No. PCT/JP2010/001997.

(Continued)

*Primary Examiner* — Kiley Stoner
(74) *Attorney, Agent, or Firm* — Kenyon & Kenyon LLP

(57) ABSTRACT

A device for cooling a rail weld zone according to the invention includes a first cooler cooling a head portion of the rail weld zone, a second cooler cooling a rail web portion of the rail weld zone, and a control section controlling the first and second coolers. The first cooler includes a first temperature detecting section that detects the temperature of the head portion, and a first ejection section that ejects a first cooling fluid to the head portion. The second cooler includes a second temperature detecting section that detects the temperature of the rail web portion, and a second ejection section that ejects a second cooling fluid to the rail web portion. The control section individually changes the kinds, the flow rates, and the flow velocities of the first and second cooling fluids while cooling the head portion and the rail web portion.

10 Claims, 10 Drawing Sheets

U.S. PATENT DOCUMENTS

| | | | |
|---|---|---|---|
| 6,163,003 A * | 12/2000 | Battisti | 219/55 |
| 6,224,694 B1 * | 5/2001 | Prskawetz et al. | 148/581 |
| 6,432,230 B1 * | 8/2002 | Kock et al. | 148/646 |
| 6,852,940 B1 * | 2/2005 | Muhlleitner | 219/55 |

FOREIGN PATENT DOCUMENTS

| | | |
|---|---|---|
| JP | 56-136292 | 10/1981 |
| JP | 59-093837 | 5/1984 |
| JP | 59-093838 | 5/1984 |
| JP | 59-093838 A * | 5/1984 |
| JP | 60-033313 | 2/1985 |
| JP | 62-056523 | 3/1987 |
| JP | 62-227040 | 10/1987 |
| JP | 03-249127 | 11/1991 |
| JP | 06-228648 | 8/1994 |
| JP | 06-292968 | 10/1994 |
| JP | 06-299246 | 10/1994 |
| JP | 08-337819 | 12/1996 |
| JP | 11-270810 | 10/1999 |
| JP | 2004-211194 | 7/2004 |
| JP | 2008-050687 | 3/2008 |
| JP | 2008-137053 | 6/2008 |
| RU | 2003705 | 11/1993 |
| RU | 2107740 | 3/1998 |
| RU | 2309185 | 10/2007 |
| SU | 1735392 | 5/1992 |

OTHER PUBLICATIONS

Japanese Office Action dated Jan. 25, 2011, issued in corresponding Japanese Patent Application No. 2010-528631.

Urashima, Chikayuki et al., "The Influence of Residual Stress on Durability of Rails", Proceedings of the Second International Conference on Residual Stresses, ICR2, Nancy, France, 23-25, Nov. 1988, pp. 912-918.

Russian Notice of Allowance, dated Jul. 6, 2012, issued in corresponding Russian Application No. 2011138958, with an English translation thereof.

* cited by examiner

DEVICE AND METHOD FOR COOLING RAIL WELD ZONE

TECHNICAL FIELD

The present invention relates to a device and method for cooling a rail weld zone after a rail is welded.

This application is a national stage application of International Application No. PCT/JP2010/001997, filed Mar. 19, 2010, which claims priority to Japanese Patent Application No. 2009-079938, filed Mar. 27, 2009, the content of which is incorporated herein by reference.

BACKGROUND ART

A joint of a rail is a portion that is most easily damaged in the rail and incurs maintenance cost. Further, a joint of a rail is a main generation source of noise and vibration that are generated during the passage of a train. The speed of passenger rail services and the load of freight trains are increasing at home and abroad. From this situation, a technique for manufacturing a long rail having a length of 200 m or more by continuously connecting joints of rails by welding is becoming widespread.

As main methods of welding a rail joint, there are flash butt welding (for example, see Patent Document 1), gas pressure welding (for example, see Patent Document 2), enclosed arc welding (for example, see Patent Document 3), and Thermit welding (for example, see Patent Document 4).

When a joint of a rail is welded, stress is concentrated in the vicinity of the neutral axis of a rail weld zone. Accordingly, it is necessary to frequently replace a rail in order to prevent fatigue cracks from being generated. FIG. 7A shows an aspect where a fatigue crack 51 extending in the horizontal direction is generated in the vicinity of the neutral axis of a rail weld zone 50 and a brittle crack 52 is growing toward a rail head portion and a rail foot portion. An aspect where the fatigue crack 51 is generated from the vicinity of the neutral axis of the rail weld zone 50 as an origination and the brittle crack 52 then penetrates the rail web portion in the thickness direction is found from FIG. 7B that shows a fracture surface of the crack.

Meanwhile, in this specification, a rail upper portion coming into contact with a wheel is referred to as a "head portion", a rail lower portion coming into contact with a sleeper is referred to as a "foot portion", and a portion formed between the head portion and the foot portion is referred to as a "rail web portion". Further, the upper surface of the head portion is referred to as a "head-top portion", side surfaces of the head portion are referred to as "head-side portions", and the back surface of the foot portion is referred to as a "sole portion".

It is considered that the generation of the fatigue crack is affected by not only an external load condition but also residual stress in the rail weld zone. FIGS. 8A, 8B, and 9 show an example of residual stress distribution generated when a joint of a rail is subjected to flash butt welding. In the graphs of FIGS. 8A, 8B, and 9, a positive direction of the vertical axis represents tensile residual stress and a negative direction of the vertical axis represents compressive residual stress. FIG. 8A shows the residual stress distribution which is generated at a peripheral portion of the rail weld zone in a circumferential direction. From FIG. 8A, it is found that tensile residual stress of the rail web portion is large. Further, FIG. 8B is a view showing tensile residual stress of a middle portion of the rail web portion in the circumferential direction (vertical direction), while a distance from a welding center plane in the axial direction of the rail is represented on the horizontal axis. From FIG. 8B, it is found that tensile residual stress in the circumferential direction (vertical direction) is distributed in the range between the welding center plane and a position that is distant from the welding center plane by a distance of about 25 mm. If a rail weld zone is positioned on the sleeper, compressive stress in the vertical direction acts on the rail web portion during the passage of a train. However, large tensile stress in the vertical direction remains at the rail web portion. Accordingly, while tensile stress is always substantially applied to the rail web portion, the rail web portion repeatedly receives stress. For this reason, fatigue cracks are apt to be generated at the rail web portion. Meanwhile, FIG. 9 shows the residual stress distribution of the peripheral portion of the rail weld zone in the axial direction of the rail. From FIG. 9, it is found that large compressive stress remains at a rail sole portion. If a rail weld zone is positioned between sleepers, tensile stress in the axial direction of the rail acts on the rail sole portion during the passage of a train. However, the tensile stress in the axial direction of the rail and the compressive residual stress in the axial direction of the rail offset each other. Accordingly, while compressive stress is always substantially applied to the rail foot portion, the rail foot portion repeatedly receives stress. For this reason, fatigue cracks are not easily generated at the rail foot portion.

In order to prevent the damage to the rail web portion, a method of rapidly cooling the head portion and the rail web portion of the rail weld zone or the entire rail weld zone, which is in a high-temperature state by welding heat or heat transferred from the outside, is proposed in Patent Document 5 and Patent Document 6. According to this method, it is possible to reduce tensile residual stress that is generated at the rail web portion of the rail weld zone in the vertical direction or to convert the tensile residual stress into compressive stress. Accordingly, it is possible to improve the fatigue resistance of the rail weld zone.

Further, as techniques that improve the fatigue strength of the rail weld zone, there is a method that uses a shot-peening treatment (for example, see Patent Document 7) or the like. In the shot-peening treatment, steel balls which have a diameter of several mm are projected to a material to plastically deform the surface layer of the material, so that the surface layer is subjected to work hardening. That is, it is possible to improve fatigue strength by converting residual stress into compressive stress.

Furthermore, the invention of a device for cooling a rail weld zone is disclosed in Patent Document 8. The device includes an air chamber that cools a head-top surface of the rail weld zone, an air chamber that cools head-side surfaces of the rail weld zone, and air chambers that cool an abdomen portion (rail web portion) and a bottom portion (foot portion) of the rail weld zone. Each of the air chambers is provided with a plurality of nozzles that ejects compressed air, and a nozzle for detecting temperature is provided in the middle of a nozzle group of the air chamber that cools the head-top portion.

RELATED ART DOCUMENTS

Patent Documents

[Patent Document 1] Japanese Unexamined Patent Application, First Publication No. S56-136292

[Patent Document 2] Japanese Unexamined Patent Application, First Publication No. H11-270810

[Patent Document 3] Japanese Unexamined Patent Application, First Publication No. H06-292968

[Patent Document 4] Japanese Unexamined Patent Application, First Publication No. S48-095337

[Patent Document 5] Japanese Unexamined Patent Application, First Publication No. S59-093837

[Patent Document 6] Japanese Unexamined Patent Application, First Publication No. S59-093838

[Patent Document 7] Japanese Unexamined Patent Application, First Publication No. H03-249127

[Patent Document 8] Japanese Unexamined Patent Application, First Publication No. S60-033313

Non-Patent Document

[Non-patent Document 1] Proceedings of the Second International Conference on Residual Stresses, ICR2, Nancy, France, 23-25, November 1988, p. 912-918

DISCLOSURE OF THE INVENTION

Problems to be Solved by the Invention

When a head portion and a rail web portion of a rail weld zone are cooled by a cooling method disclosed in Patent Document 5 and Patent Document 6, the residual stress of the rail web portion in the vertical direction is reduced, so that the generation of fatigue cracks at the rail web portion is suppressed. However, in the case of this method, the residual stress of a sole portion in the axial direction of a rail is converted into tensile stress as disclosed in Non-patent Document 1. In recent years, the weight of railroad cars of freight rails tends to increase. For this reason, since bending moment acting on a rail also increases, bending fatigue resistance is lowered when the residual stress of a sole portion in the axial direction of the rail is converted into tensile stress.

Further, shot-peening treatment requires large facilities that project steel balls, collect the steel balls, and prevent dust, and the like. For this reason, the application of the shot-peening treatment to a large weld zone is limited. In addition, since the steel balls are abraded and damaged, the steel balls need to be supplied at regular intervals. Accordingly running cost increases.

Furthermore, according to the cooling device disclosed in Patent Document 8, it is possible to increase the hardness of the rail weld zone but it is not possible to control the residual stress of the rail weld zone. From tests performed by the inventors, it is found that the residual stress of the rail web portion is not reduced and fatigue life is not much lengthened as described below when the accelerated cooling of the rail weld zone is performed by the cooling device disclosed in Patent Document 8. That is, it is apparent that the residual stress of the rail weld zone cannot be reduced unless cooling is performed in an appropriate range of the rail weld zone at an appropriate cooling rate.

In order to solve the above-mentioned problem, an object of the invention is to provide a method and device for cooling a rail weld zone that are used to manufacture a rail of which the fatigue strength of a rail weld zone is improved as compared to the related art.

Means for Solving the Problems

The invention employs the following in order to achieve the above-mentioned object.

(1) According to a first aspect of the invention, there is provided a device for cooling a rail weld zone that includes a first cooler cooling a head portion of the rail weld zone, a second cooler cooling a rail web portion of the rail weld zone, and a control section controlling the first and second coolers. The first cooler includes a first temperature detecting section that detects the temperature of the head portion, and a first ejection section that ejects a first cooling fluid to the head portion. The second cooler includes a second temperature detecting section that detects the temperature of the rail web portion, and a second ejection section that ejects a second cooling fluid to the rail web portion. The control section individually changes the kinds, the flow rates, and the flow velocities of the first and second cooling fluids.

(2) In the device according to (1), the second ejection section may include a cooling width adjusting section. The cooling width adjusting section adjusts the second cooler so that the second cooling fluid is ejected so as to make the cooling width of the rail weld zone correspond to an area in the range of 35% to 75% of the width of the rail weld zone in the axial direction of a rail.

(3) In the device according to (1) or (2), each of the first and second ejection sections may include at least two of air ejection holes, gas-water ejection holes, and water ejection holes, and the kinds of the first and second cooling fluids, which are individually changed by the control section, may be air, gas-water, and water.

(4) According to a second aspect of the invention, there is provided a method of cooling a rail weld zone that separately cools a head portion and a rail web portion of a rail weld zone. The method includes a first temperature detecting process of detecting the temperature of the head portion, a second temperature detecting process of detecting the temperature of the rail web portion, a first ejection process of ejecting a first cooling fluid to the head portion, a second ejection process of ejecting a second cooling fluid to the rail web portion, and a control process of individually changing the kinds, the flow rates, and the flow velocities of the first and second cooling fluids while cooling the head portion and the rail web portion.

(5) In the method according to (4), in the second ejection process, the second cooling fluid may be ejected to an area corresponding to a width in the range of 35% to 75% of the width of the rail weld zone in the axial direction of a rail.

(6) In the method according to (4) or (5), the kinds of the first and second cooling fluids, which are individually changed in the control process, may be air, gas-water, and water.

(7) In the method according to (4), the second ejection process may be performed after the rail web portion is completely transformed to pearlite from an austenite temperature region.

(8) In the method according to (4), the second ejection process may be performed until the rail web portion is completely transformed to pearlite from an austenite temperature region.

(9) In the method according to (4), the second ejection process may be performed until the temperature of the rail web portion reaches about 200° C. after pearlite transformation is completed from a state where the rail web portion is in an austenite temperature region.

(10) In the method according to (4), the first ejection process may be performed until the head portion is completely transformed to pearlite from an austenite temperature region. The second ejection process may be performed until the rail web portion is completely transformed to pearlite from an austenite temperature region and after the rail web portion is completely transformed to pearlite from an austenite temperature region.

Advantageous Effects of Invention

According to the device of (1), only the head portion and the rail web portion of the rail weld zone are subjected to accelerated cooling and the foot portion is not subjected to accelerated cooling. Further, since the accelerated cooling of the head portion and the accelerated cooling of the rail web portion are individually controlled, it is possible to perform cooling in an appropriate range of the rail weld zone at an appropriate cooling rate. Accordingly, it is possible to reduce the residual stress of the rail weld zone. Therefore, the fatigue strength of the rail weld zone is improved as compared to the related art.

According to the device of (2), it is possible to set the cooling width of the rail to an optimal range. For this reason, it is possible to further reduce residual stress by flattening temperature distribution in the vicinity of the welding center, so that fatigue strength is improved.

According to the device of (3), it is possible to quickly adjust the cooling rate of the rail weld zone. For this reason, it is possible to accurately control temperature.

According to the methods of (4) to (10), it is possible to perform cooling in an appropriate range of the rail weld zone at an appropriate cooling rate. Accordingly, the residual stress of the rail weld zone is reduced, so that the fatigue strength of the rail weld zone is improved as compared to the related art.

DESCRIPTION OF EMBODIMENTS

Figure 1:
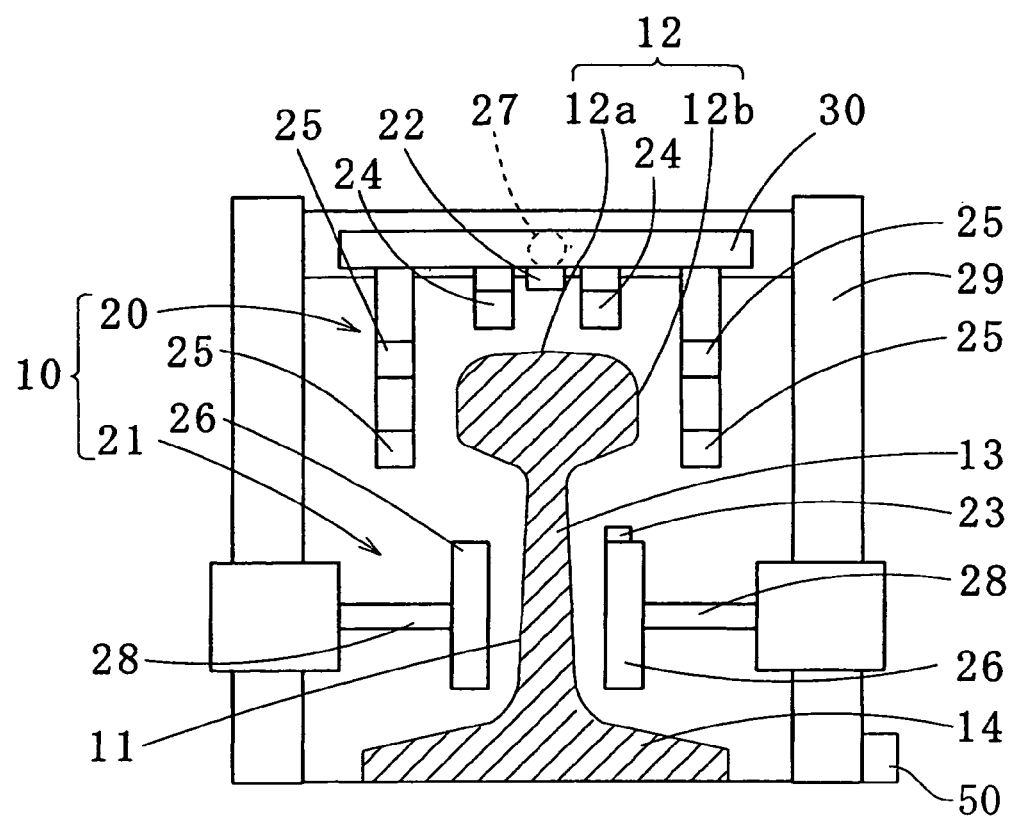
FIG. 1 is a front view of a device for cooling a rail weld zone according to an embodiment of the invention.

The inventors found the following (A) to (C) as a result of the research about a relationship between the fatigue strength of a rail weld zone and a method of cooling a rail weld zone.

(A) When the temperature of a foot portion becomes lower than that of a rail web portion through the accelerated cooling of a foot portion of a rail weld zone, shrinkage strain generated at the rail web portion in the axial direction of a rail is affected by the foot portion of which the temperature is lower. Accordingly, tensile stress in the axial direction of the rail is generated at the rail web portion, and tensile stress corresponding to Poisson's ratio is also generated in the vertical direction. As a result, the tensile residual stress of the rail web portion in the vertical direction is increased. Therefore, it is not preferable that the temperature of the foot portion of the rail weld zone be made lower than the temperature of the rail web portion through accelerated cooling.

(B) If rail web portion is subjected to accelerated cooling after the completion of transformation to pearlite from an austenite temperature region, it is possible to reduce the residual stress of the rail web portion in the vertical direction. Meanwhile, if the rail web portion is subjected to accelerated cooling until the completion of transformation of the rail web portion to pearlite from an austenite temperature region, it is possible to increase fatigue strength. Further, if the accelerated cooling of the rail web portion starts from an austenite temperature region and the rail web portion is subjected to accelerated cooling even after the completion of pearlite transformation, it is possible to further increase fatigue strength.

(C) A rail head portion wears due to the contact between a wheel and itself In particular, wear is facilitated on a curved track by the relative slipping that occurs between a wheel and a rail. For this reason, a heat-treated rail of which the rail head portion is hardened is frequently employed for a curved section. In welding the heat-treated rail, it is preferable that the same hardness as the hardness of a base material to be welded be obtained by performing the accelerated cooling of the rail head portion after welding in a temperature range until the completion of pearlite transformation from an austenite temperature region.

The inventors devised a device for cooling a rail weld zone of the invention on the basis of the above-mentioned (A) to (C). A cooling device according to an embodiment of the invention will be described below. The cooling device according to the embodiment of the invention performs the accelerated cooling of only a head portion and a rail web portion of a rail weld zone, and does not perform the accelerated cooling of a foot portion. Further, in this cooling device, respective cooling units are individually controlled so as to be capable of performing the accelerated cooling of the head portion and the rail web portion at an appropriate cooling rate. Furthermore, the respective cooling units are adapted so as to change the kind, the flow rate, and the flow velocity of a cooling fluid during cooling. According to this structure, it is possible to quickly adjust the cooling rate of a rail weld zone. Any one of air, gas-water (mixed fluid of air and water), and water may be selected according to a cooling rate as the kind of the cooling fluid.

Figure 10:
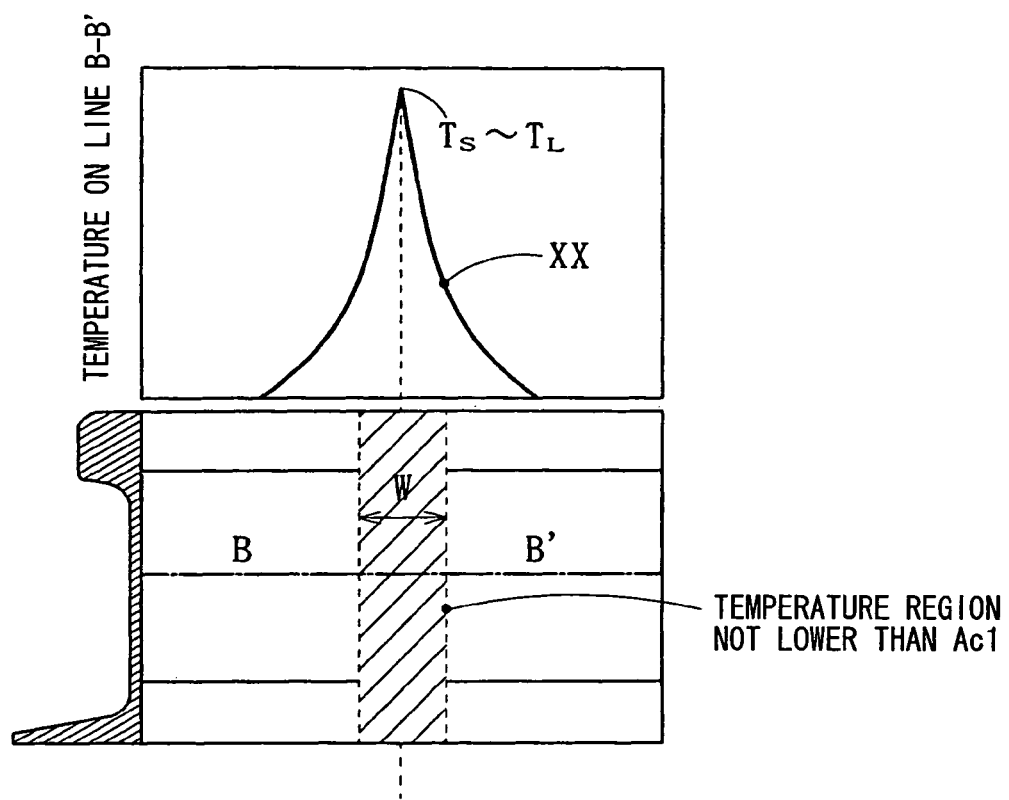
FIG. 10 is a schematic view showing the temperature distribution of a rail web portion of a rail weld zone immediately after welding.

Further, in the above-mentioned device for cooling a rail weld zone, it is preferable that the cooling width can be adjusted so that a value represented as (cooling width of a rail web portion of a rail weld zone in the axial direction of a rail)/(width of a rail weld zone in the axial direction of a rail) is in the range of 0.35 to 0.75. Here, (cooling width of the rail web portion of the rail weld zone in the axial direction of the rail)/(width of the rail weld zone in the axial direction of the rail) will be additionally described. FIG. 10 is a schematic view showing the temperature distribution of the rail web portion of a rail weld zone immediately after welding, and a solid line XX shows temperature distribution at that time point. In FIG. 10, $T_S$ denotes solidus temperature and $T_L$ denotes liquidus temperature. The width of a rail weld zone in the axial direction of a rail is a temperature region W where the temperature of a rail weld zone immediately after welding is not lower than an austenite transformation starting temperature Ac1. Further, the cooling width of the rail web portion of the rail weld zone in the axial direction of the rail is the ejection range of a cooling fluid, which is ejected from the cooling device to the rail web portion of the rail weld zone, in the axial direction of the rail.

Hereinafter, (cooling width of the rail web portion of the rail weld zone in the axial direction of the rail)/(width of the rail weld zone in the axial direction of the rail) is referred to as a "cooling width ratio". It is possible to reduce the residual stress of the rail web portion in the vertical direction by flattening the temperature distribution of the rail web portion in the vicinity of the weld zone. For this reason, it is effective to limit the cooling width, where accelerated cooling is performed, to a high-temperature region in the vicinity of a welding center. When the cooling width ratio is set to 0.75 or less, it is possible to reduce residual stress by flattening temperature distribution in the vicinity of the welding center. Meanwhile, when the cooling width ratio is smaller than 0.35, cooling efficiency decreases, so that the effect of reducing residual stress is lowered.

Subsequently, an embodiment of the invention will be described in more detail with reference to the accompanying drawings.

[Flash Butt Welding]

The residual stress of the rail web portion of the rail weld zone in the vertical direction is significant in the flash butt welding where a temperature gradient becomes steepest. For this reason, in this specification, flash butt welding is described as an example of a method of welding a rail joint. Meanwhile, the method of cooling a rail weld zone according to the invention may be applied to other welding methods such as Thermit welding.

Figure 6A:
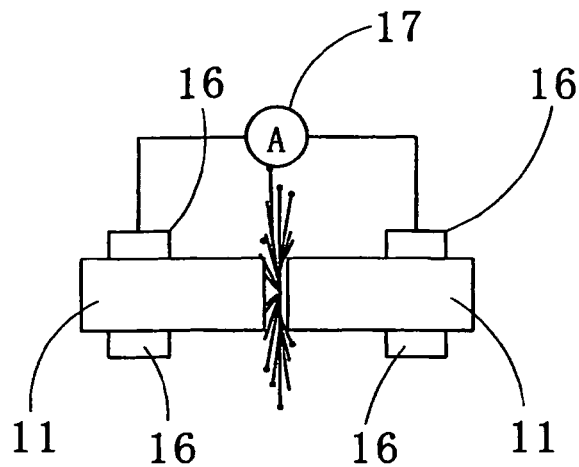
FIG. 6A is a schematic view illustrating a flashing process of flash butt welding.
Figure 6B:
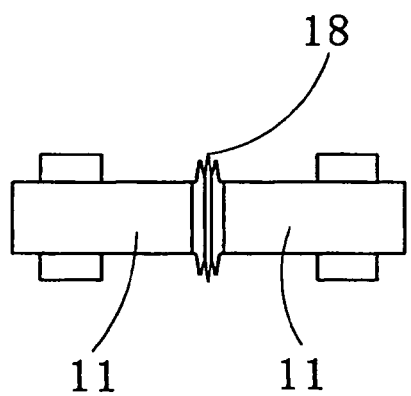
FIG. 6B is a schematic view illustrating an upset process of flash butt welding.
Figure 6C:
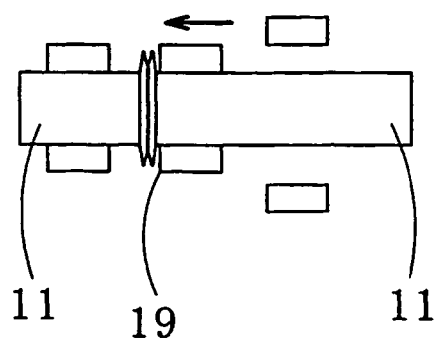
FIG. 6C is a schematic view illustrating a trimming process of flash butt welding.
Figure 7A:
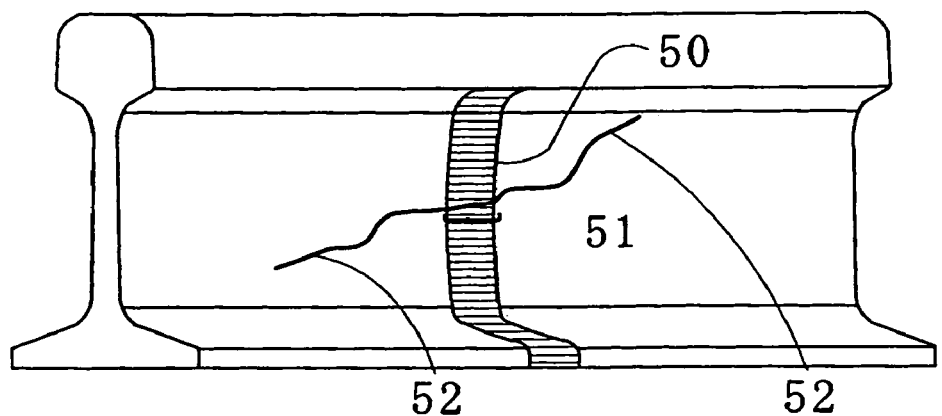
FIG. 7A is a schematic view showing an example of damage that is caused by a fatigue crack in a rail weld zone.
Figure 7B:
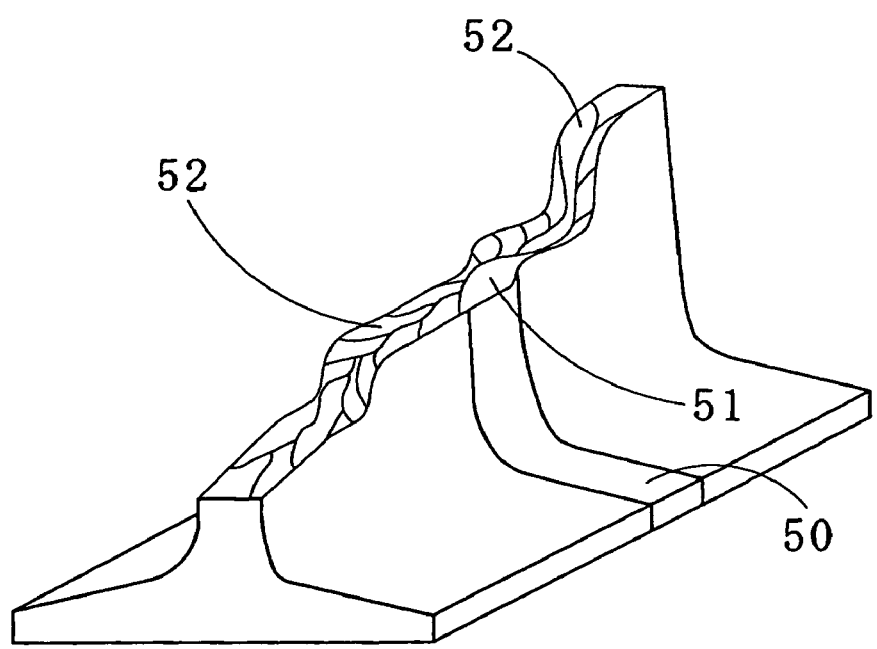
FIG. 7B is a schematic view showing a fracture surface of the fatigue crack.
Figure 8A:
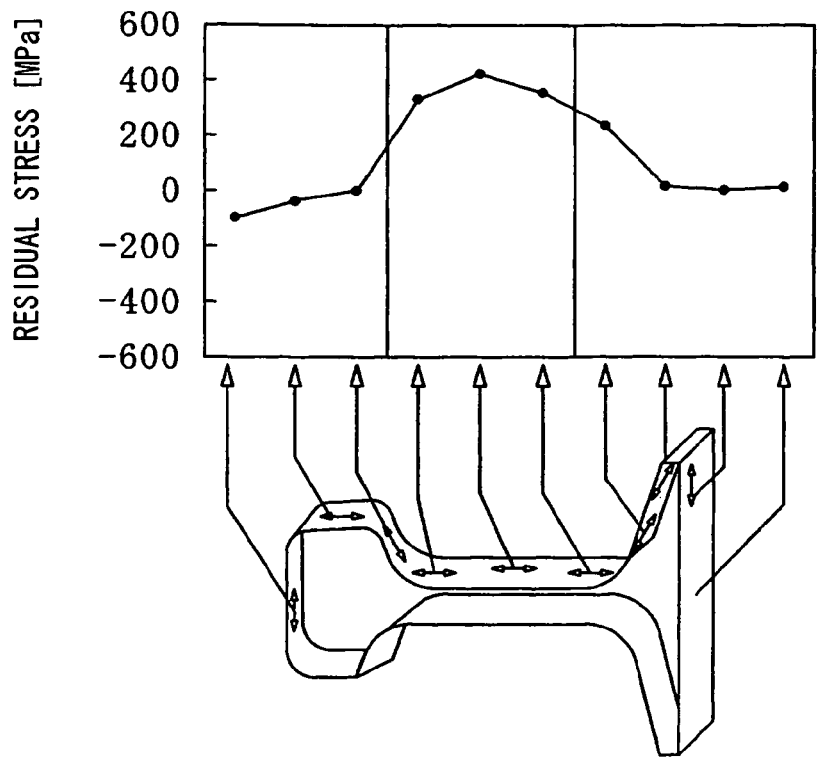
FIG. 8A is a view showing the residual stress distribution, which is generated by flash butt welding at a peripheral portion of a rail weld zone, in a circumferential direction.
Figure 8B:
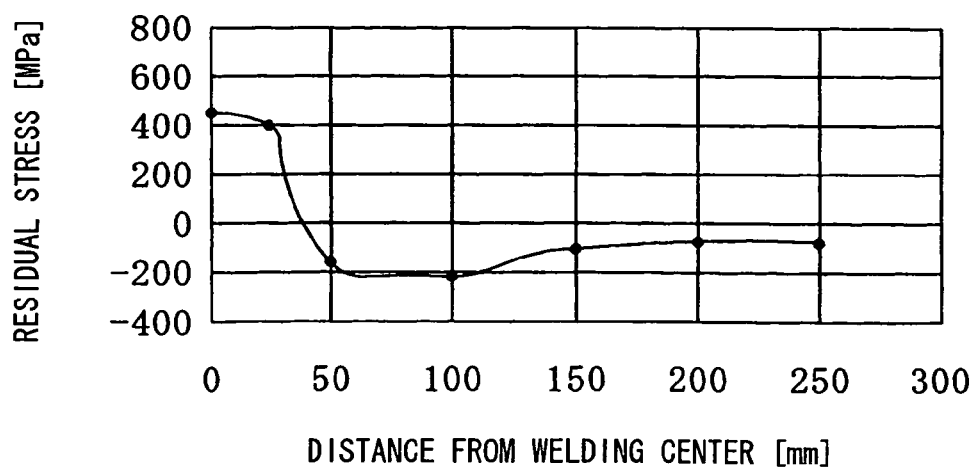
FIG. 8B is a view showing tensile residual stress of a middle portion of a rail web portion in a circumferential direction (vertical direction) while a distance from a welding center plane in the axial direction of a rail is represented on the horizontal axis.
Figure 9:
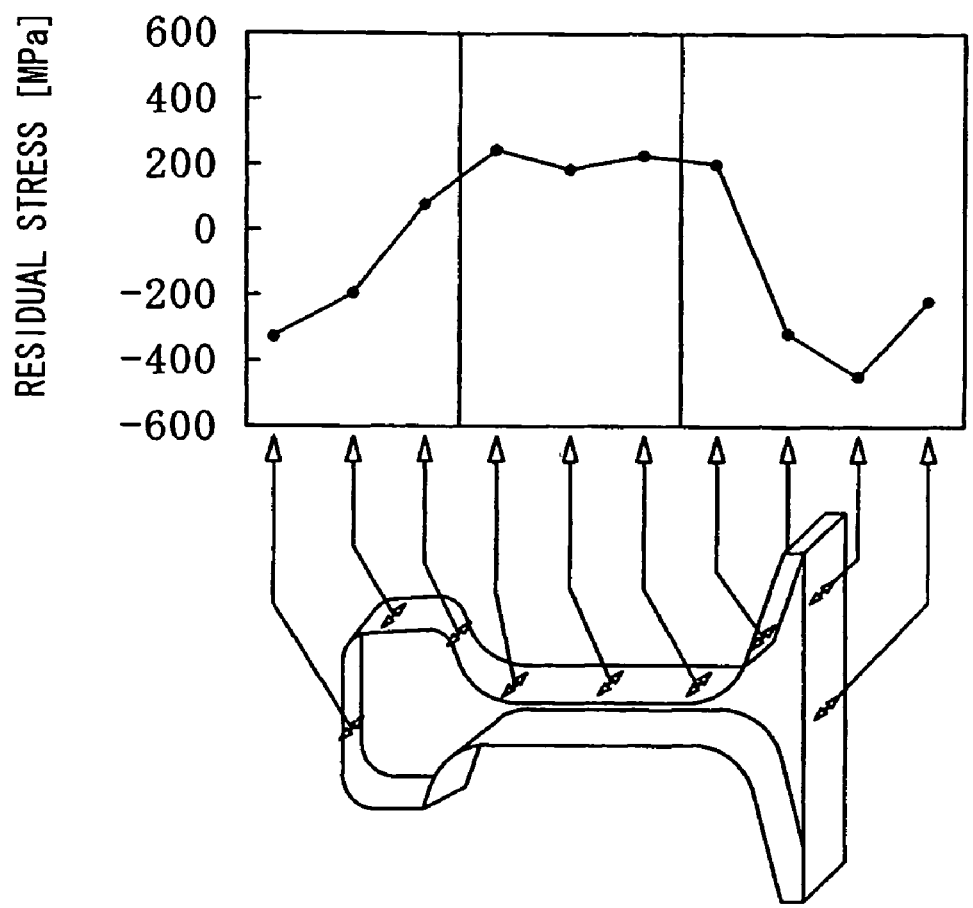
FIG. 9 is a view showing the residual stress distribution of a peripheral portion of a rail weld zone in the axial direction of a rail.

Schematic views illustrating flash butt welding are shown in FIGS. 6A, 6B, and 6C. In a first process that is referred to as a flashing process, an arc is continuously generated between the end faces of rails 11, which are provided in line, by a voltage that is applied through electrodes 16 connected to a power source 17 (see FIG. 6A). Portions where arc is generated are locally melted, a part of molten metal is discharged to the outside as spatters, and the rest of molten metal remains on the end faces of the rails 11. Recesses, which are referred to as craters, are formed at the portions that are melted by arc. As the rails 11 gradually approach each other, arc is successively generated at new contact portions and the rails 11 are gradually shortened by the repetition of the local melting thereof. When the flashing process continues for several tens of seconds to several minutes, the entire end faces of the rails 11 are melted. Further, portions of the rails 11 in the vicinity of the end faces are softened due to the rise of temperature. Pressing in the axial direction of the rail is performed as shown in FIG. 6B at the time point where the rails reach this state. The craters, which are formed at the end faces of the rails 11, are crushed by this pressing that is referred to as upset. Accordingly, the molten metal, which exists between the end faces, is extruded to the outside of a weld surface. The cross section of a portion in the vicinity of the softened end face increases due to plastic deformation and a bead 18 is formed around the weld surface. The bead 18 is sheared and removed by trimmers 19 as shown in FIG. 6C when at a high temperature immediately after welding. This process is referred to as trimming. After trimming, a thin bead 18 remains around a weld zone. The thin bead 18, which remains at a rail head portion, is polished by a grinder so as to be smoothed. Meanwhile, the thin bead 18, which remains at the rail web portion and the rail foot portion, is polished by a grinder. However, the thin bead may not be treated by a railway company.

[Rail Steel]

As defined in JIS-E1101 "normal rail and special rail for turnouts and crossings" and JIS-E1120 "heat-treated rail", eutectoid or hypoeutectoid carbon steel containing 0.5 to 0.8% by mass of carbon is generally used as rail steel. Further, rail steel, which has hypereutectoid composition, contains carbon exceeding 0.8% by mass, and further improves wear resistance of a heavy load freight line of a foreign mining railway, is also being spread in recent years.

[Mechanism for Generating Residual Stress]

When non-uniform shrinkage strain caused by non-uniform temperature in a rail exists, respective portions of the rail restrict shrinkage strain together with each other, so that shrinkage stress is generated. When the shrinkage stress remains as internal stress, the shrinkage stress is referred to as residual stress. When joints of rails are welded to each other, large temperature difference is generated between a rail weld zone and peripheral portions. Accordingly, shrinkage stress is generated at the rail weld zone and becomes residual stress. Accordingly, if accelerated cooling is performed in the vicinity of a welding center, temperature distribution in the vicinity of the welding center is flattened. Therefore, the generation of residual stress at the welding center is suppressed. Since large residual stress is already generated even though flat temperature distribution is obtained while the central temperature of the rail weld zone is lower than 200° C., the effect of reducing residual stress is small. Meanwhile, "accelerated cooling" is to forcibly cool a material which is to be cooled at a cooling rate higher than the cooling rate of natural cooling by ejecting a cooling fluid to the material to be cooled.

[Device for Cooling Rail Weld Zone]

Figure 2:
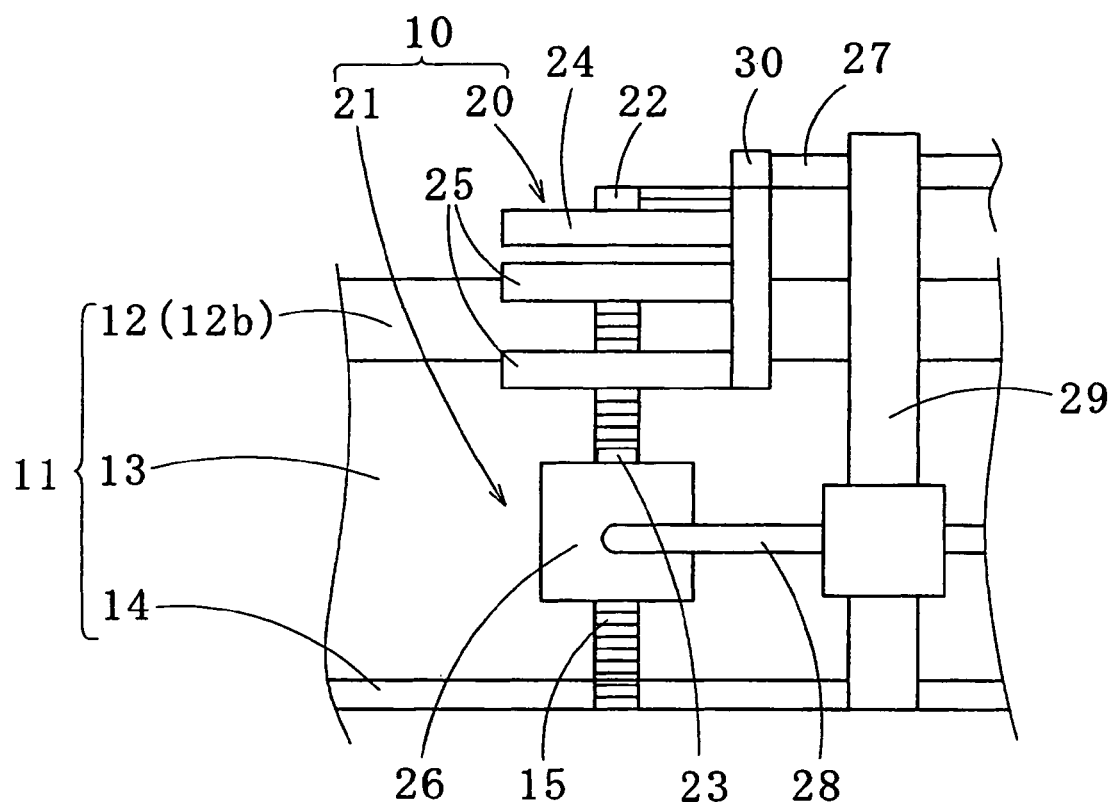
FIG. 2 is a side view of the cooling device.

FIGS. 1 and 2 are schematic views of a device 10 for cooling a rail weld zone (hereinafter, simply referred to as a cooling device 10) according to an embodiment of the invention. The cooling device 10 includes a first cooling unit 20 that performs accelerated cooling of a head portion 12 of a rail weld zone 15 after a rail 11 is welded, and a second cooling unit 21 that performs accelerated cooling of a rail web portion 13 of the rail weld zone 15. The cooling device does not include a cooling unit that performs accelerated cooling of a foot portion 14 of the rail weld zone 15.

The first cooling unit 20 includes a pair of ejection sections 24 that is disposed immediately above a head-top portion 12a of the rail weld zone 15 and ejects a cooling fluid to the head-top portion 12a, two pairs of ejection sections 25 that are disposed so as to face each other with the head portion 12 interposed therebetween and eject a cooling fluid to head-side portions 12b, and a non-contact temperature sensor 22 that is disposed between the pair of ejection sections 24 and measures the temperature of the head portion 12. Meanwhile, the second cooling unit 21 includes a pair of ejection sections 26 that is disposed so as to face each other with the rail web portion 13 of the rail weld zone 15 interposed therebetween and ejects a cooling fluid to the rail web portion 13, and a non-contact temperature sensor 23 that is disposed on one ejection section 26 and measures the temperature of the rail web portion 13. Further, the cooling device 10 is provided with a control unit 50 that separately controls the first and second cooling units 20 and 21. This controller 50 may be provided at each of the first cooling unit 20 and the second cooling unit 21. The position of the control unit is not particularly limited, but the control may be disposed at, for example, a lower portion of a pedestal 29 as shown in FIG. 1.

The first cooling unit 20, which performs the accelerated cooling of the head portion 12 of the rail weld zone 15, is supported by a header 30, and a cooling fluid is supplied to the respective ejection sections 24 and 25 from a supply tube 27 through the header 30. Meanwhile, supply tubes 28, which supply a cooling fluid, are connected to the ejection sections 26 of the second cooling unit 21 that performs the accelerated cooling of the rail web portion 13 of the rail weld zone 15. The supply tubes 27 and 28 are held on the pedestal 29 that is formed of a portal frame built over the rail weld zone 15.

Figure 3A:
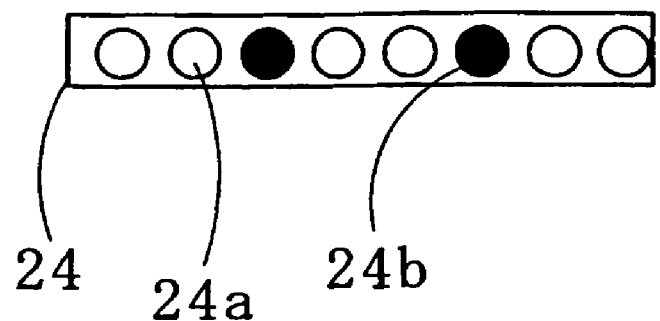
FIG. 3A is a front view of a first ejection section of the cooling device.
Figure 3B:
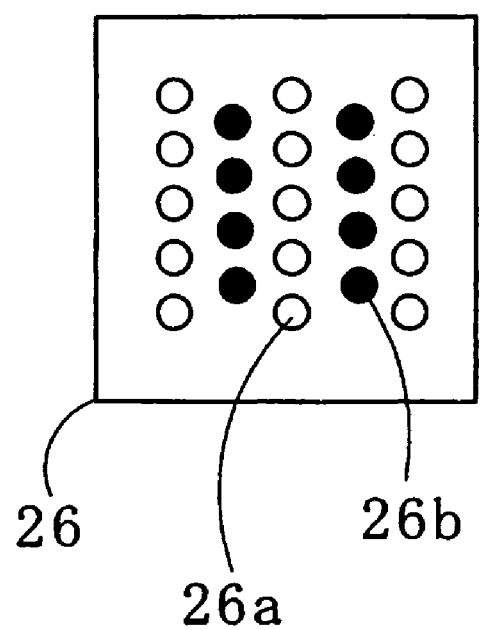
FIG. 3B is a front view of a second ejection section of the cooling device.

FIG. 3A shows a front view of the ejection section 24 (which is also the same as the ejection section 25), and FIG. 3B shows a front view of the ejection section 26. A plurality of ejection holes 24a and 24b is regularly formed at the ejection section 24, and a plurality of ejection holes 26a and 26b is regularly formed at the ejection section 26. Compressed air is ejected from the ejection holes 24a and 26a, and gas-water is ejected form the ejection holes 24b and 26b. The ejection holes 24a and 26a and the ejection holes 24b and 26b are switched and used according to cooling rate. Further, when a cooling fluid is ejected from the ejection holes 26a and 26b, it is preferable that (cooling width of the rail web portion 13 of the rail weld zone 15 in the axial direction of the rail)/(width of the rail weld zone 15 in the axial direction of the rail) be in the range of 0.35 to 0.75. That is, when the width of the rail weld zone 15 in the axial direction of the rail is 40 mm, it is preferable that the cooling width of the rail web portion 13 of the rail weld zone 15 in the axial direction of the rail be set to the range of 14 mm to 30 mm. If the cooling width is set to this range, it is possible to suppress the increase of the residual stress of the rail web portion and to lengthen fatigue life. For example, nozzles, which are provided at the ejection holes shown in FIG. 3B and can appropriately change an ejection direction, and the like may be used as the structure for adjusting the cooling width. Alternatively, ejection from each of the ejection holes of a column may be controlled.

[Method of Cooling Rail Weld Zone]

Next, a method of cooling the rail weld zone 15 by the cooling device 10 will be described. Meanwhile, in the following method, the determination of whether the head portion 12 and the rail web portion 13 of the rail weld zone 15 have been completely transformed to pearlite from an austenite temperature region is estimated from the temperature of each portion that is measured (detected) by the temperature sensors 22 and 23. Further, the accelerated cooling of each portion is performed on the basis of a cooling rate, which is calculated in a control section from the measurement results of the temperature sensors 22 and 23.

(1) First Cooling Method

After the rail web portion 13 of the rail weld zone 15 is completely transformed to pearlite from an austenite temperature region, a cooling fluid is ejected from the ejection sections 26 of the second cooling unit 21 so that the rail web portion 13 is subjected to accelerated cooling. Meanwhile, the head portion 12 and the foot portion 14 of the rail weld zone 15 are subjected to natural cooling.

(2) Second Cooling Method

Until the rail web portion 13 of the rail weld zone 15 is completely transformed to pearlite from an austenite temperature region, a cooling fluid is ejected from the ejection sections 26 of the second cooling unit 21 so that the rail web portion 13 is subjected to accelerated cooling. Meanwhile, the head portion 12 and the foot portion 14 of the rail weld zone 15 are subjected to natural cooling.

(3) Third Cooling Method

After pearlite transformation is completed from a state where the rail web portion 13 of the rail weld zone 15 is in an austenite temperature region, a cooling fluid is ejected from the ejection sections 26 of the second cooling unit 21 so that the rail web portion 13 is subjected to accelerated cooling until the temperature of the rail web portion 13 reaches about 200° C. Meanwhile, the head portion 12 and the foot portion 14 of the rail weld zone 15 are subjected to natural cooling.

(4) Fourth Cooling Method

Until the head portion 12 and the rail web portion 13 of the rail weld zone 15 are completely transformed to pearlite from an austenite temperature region, a cooling fluid is ejected from the ejection sections 24, 25, and 26 of the first and second cooling units 20 and 21 so that the head portion 12 and the rail web portion 13 are subjected to accelerated cooling. After transformation is completely performed to pearlite from an austenite temperature region, a cooling fluid is ejected from the ejection sections 26 of the second cooling unit 21 so that only the rail web portion 13 is subjected to accelerated cooling. Meanwhile, the foot portion 14 of the rail weld zone 15 is subjected to natural cooling.

EXAMPLE

[Cooling Test of Rail Weld Zone]

Next, a cooling test of a rail weld zone, which was performed using the cooling device 10, will be described. The respective cooling conditions of Examples of the invention are shown in Table 1 and the respective cooling conditions of Comparative Examples are shown in Table 2. Numerical values of Tables are cooling rates, and the cooling rates of other examples except for Comparative Example 2 were changed at the temperature of 500° C., which is a pearlite transformation point. Further, even though a target portion was subjected to accelerated cooling when the central temperature of the target portion was lower than 200° C., the effect of reducing residual stress is small. For this reason, accelerated cooling was performed to 200° C.

TABLE 1

|  | Example 1 | | Example 2 | | Example 3 | |
| --- | --- | --- | --- | --- | --- | --- |
|  | 500 to 800° C. | 200 to 500° C. | 500 to 800° C. | 200 to 500° C. | 500 to 800° C. | 200 to 500° C. |
| Head portion | 1.7° C./s | Natural cooling | 1.7° C./s | Natural cooling | 1.7° C./s | Natural cooling |
| Rail web portion | Natural cooling | 2° C./s | 1.8° C./s | Natural cooling | 1.8° C./s | 6° C./s |
| Foot portion | Natural cooling | Natural cooling | Natural cooling | Natural cooling | Natural cooling | Natural cooling |

TABLE 2

|  | Comparative Example 1 | | Comparative Example 2 | |
| --- | --- | --- | --- | --- |
|  | 500 to 800° C. | 200 to 500° C. | 500 to 800° C. | 200 to 500° C. |
| Head portion | 1.7° C./s | Natural cooling | Natural cooling | Natural cooling |
| Rail web portion | 1.8° C./s | Natural cooling | Natural cooling | Natural cooling |
| Foot portion | 1.2° C./s | Natural cooling | Natural cooling | Natural cooling |

In the cases of Examples 1 to 3, only a head portion and a rail web portion of a rail weld zone were subjected to accelerated cooling. In the case of Comparative Example 1, the entire rail weld zone was subjected to accelerated cooling. On the other hand, in the case of Comparative Example 2, the entire rail weld zone was subjected to natural cooling. Meanwhile, a cooling fluid used in the accelerated cooling was gas-water only in the range of 200 to 500° C. of Example 3, and was compressed air in other cases. A normal rail, which contained 0.7 to 0.8% by mass of carbon and of which a head portion had a surface hardness in the range of Hv 260 to 290, was used as a rail to be welded. The size for a general railway, which had a weight per meter of 60 kg/m, was used as the size of the rail. The width of the rail weld zone was 40 mm, and the cooling width of the rail weld zone during accelerated cooling was set to 30 mm (the cooling width ratio was 0.75). Meanwhile, even in each example, three specimens were formed under the same conditions. Among them, a first specimen was used for the measurement of residual stress, a second specimen was used in a test for evaluating the fatigue life of a rail web portion, and a third specimen was used in a test for evaluating the fatigue life of a foot portion.

The measurement of residual stress was performed as follows:

(1) A strain gauge is attached to a rail weld zone after the welding of a rail, strain is measured, and the strain is used as an initial value.

(2) After a portion of the rail weld zone around the strain gauge is cut and residual stress is released, strain is measured again.

(3) Residual stress is calculated from a relational expression between stress and strain, using a difference between measured strain before cutting and strain after cutting.

A test for evaluating the fatigue life of a rail web portion was performed as follows: A rail weld zone was placed on a surface plate, and a load was repeatedly applied to the head portion of the rail weld zone by a pressing tool of which the end was formed of an arc-shaped protrusion. The radius of curvature of the arc-shaped protrusion was 450 mm close to the radius of curvature of a wheel. The applied load was set up to 30 tons with consideration for the fact that an actual heavy load was about 20 tons. Meanwhile, the minimum load in the repetition of a load was set to 4 tons. The frequency of the repetition of a load was set to 2 Hz, and the test ended at the time point where cracks were generated at the weld zone.

A test for evaluating the fatigue life of a foot portion was performed by a bending fatigue strength test using the following three-point bending method. A rail, which had a rail weld zone in the middle thereof and had a length of 1.5 m, was symmetrically supported by mounts between which a distance was set to 1 m, and a load was repeatedly applied to the head portion of the rail weld zone by a pressing tool of which the end was formed of an arc-shaped protrusion. The radius of curvature of each of the end portions of the pressing tool and the mount was set to 100 mm. A load was applied so that the maximum stress of a sole middle portion of the rail weld zone was 330 MPa and the minimum stress thereof was 30 MPa. The frequency of the repetition of a load was set to 5 Hz, and the test ended at the time point where cracks were generated at the weld zone.

Figure 4A:
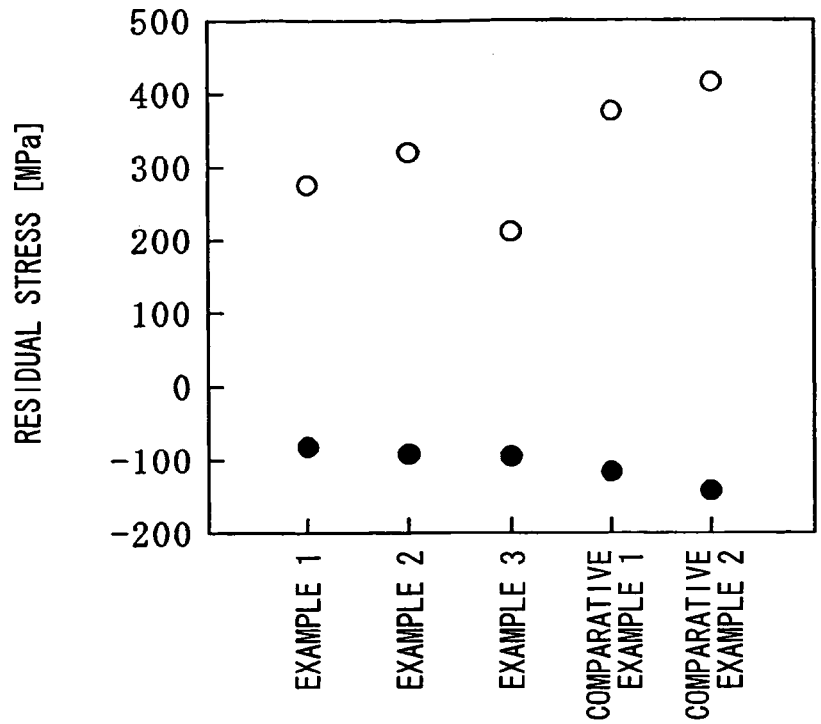
FIG. 4A is a graph showing a relationship between a method of cooling a rail weld zone and residual stress that is generated at a rail web portion and a head portion of a rail weld zone.
Figure 4B:
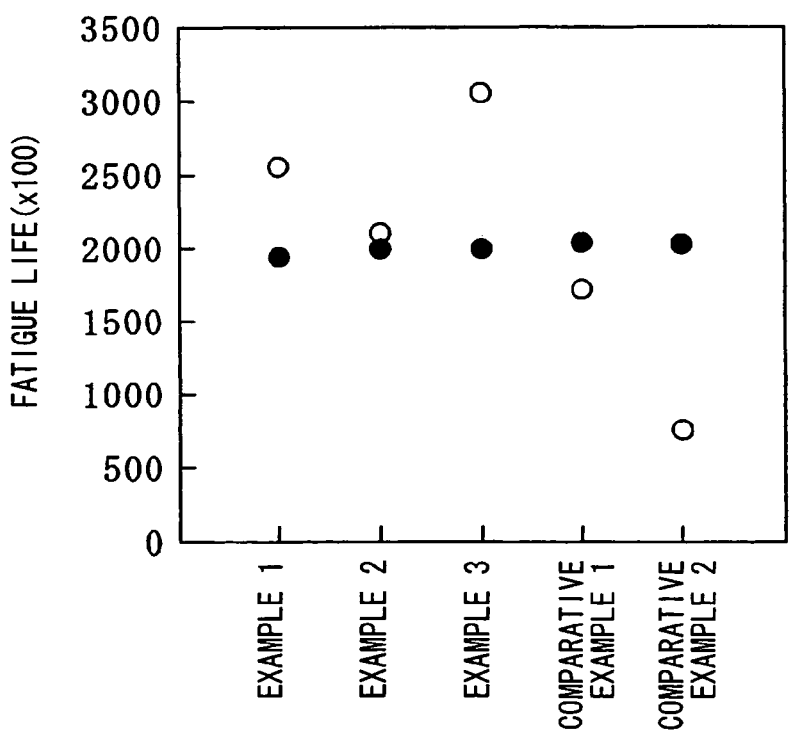
FIG. 4B is a graph showing a relationship between a method of cooling a rail weld zone and fatigue life of a rail web portion and a head portion of a rail weld zone.
Figure 5A:
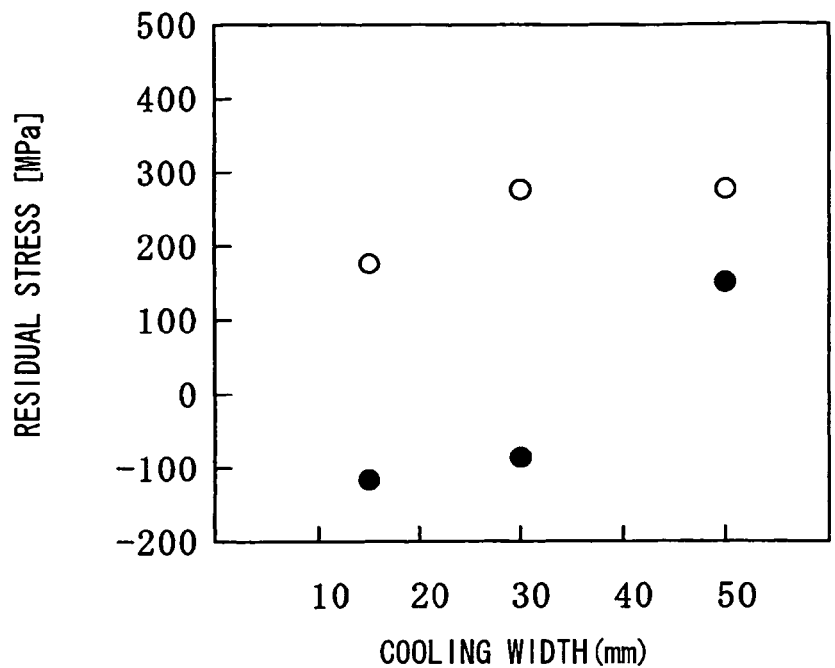
FIG. 5A is a graph showing a relationship between the cooling width ratio and residual stress that is generated at a rail web portion and a head portion of a rail weld zone.
Figure 5B:
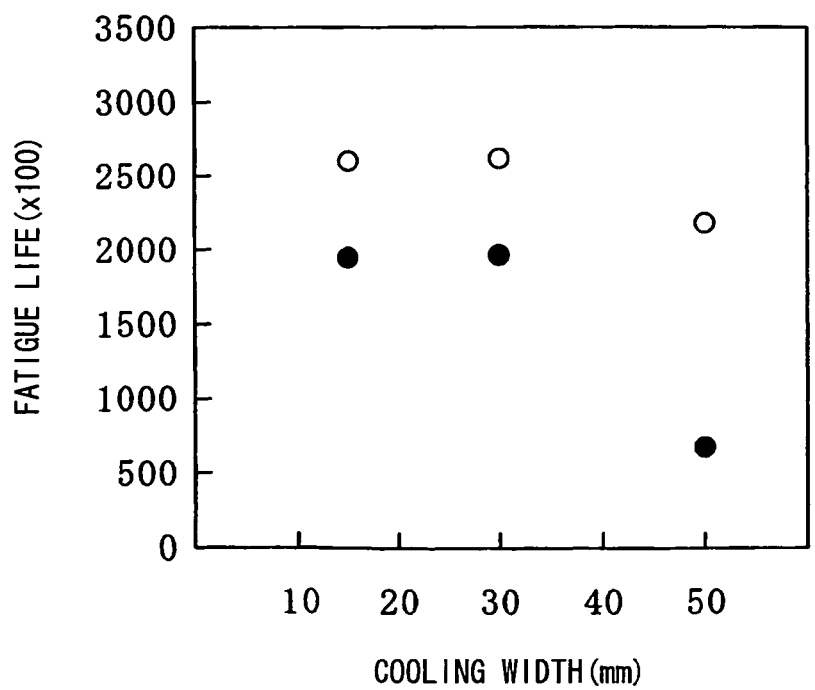
FIG. 5B is a graph showing a relationship between the cooling width ratio and fatigue life of a rail web portion and a head portion of a rail weld zone.

The residual stress generated at each of the rail weld zones of Examples 1 to 3 and Comparative Examples 1 and 2 is shown in FIG. 4A and the fatigue life of each of the rail weld zones thereof is shown in FIG. 4B. In FIGS. 4A and 4B, a white circle corresponds to the rail web portion and a black circle corresponds to the foot portion. From FIGS. 4A and 4B, it is found that the residual stress of the rail web portion of each of all the Examples is reduced and the fatigue life of the rail web portion thereof is lengthened as compared to the residual stress of the rail web portions of Comparative Examples. Further, FIGS. 5A and 5B show the results of tests for evaluating residual stress and fatigue life that were performed by the same cooling method as a method of cooling Example 1 while the cooling width was used as a parameter. In FIGS. 5A and 5B, a white circle corresponds to the rail web portion and a black circle corresponds to the foot portion. From FIGS. 5A and 5B, it is found that the residual stress of the foot portion is increased and the fatigue life of the foot portion is shortened when the cooling width was set to 50 mm (the cooling width ratio is 1.25 calculated from 50 mm/40 mm).

The embodiment of the invention has been described above. However, the invention is not limited only to the constitution of the above-mentioned embodiment, and may also include other embodiments and modifications that are considered to be within the scope of claims. For example, the ejection sections have included the ejection holes for compressed air and the ejection holes for gas-water in the above-mentioned embodiment. However, the ejection sections may further include ejection holes for water and perform switching between compressed air, gas-water, and water.

INDUSTRIAL APPLICABILITY

According to the device for cooling a rail weld zone of the invention, it is possible to manufacture a rail of which the fatigue strength of a rail weld zone is improved as compared to the related art. Accordingly, the invention has significant industrial applicability.

| Reference Signs List | |
| --- | --- |
| 10: | cooling device (device for cooling rail weld zone) |
| 11: | rail |
| 12: | head portion |
| 12a: | head-top portion |
| 12b: | head-side portion |
| 13: | rail web portion |
| 14: | foot portion |
| 15: | rail weld zone |
| 16: | electrode |
| 17: | power source |
| 18: | bead |
| 19: | trimmer |
| 20: | first cooling unit |
| 21: | second cooling unit |
| 22, 23: | temperature sensor |
| 24, 25, 26: | ejection section |
| 24a, 24b, 26a, 26b: | ejection hole |
| 27, 28: | supply tube |
| 29: | pedestal |
| 30: | header |
| 50: | control section |

The invention claimed is:

1. A device for cooling a rail weld zone, the device comprising:
   a first cooler that cools a head portion of the rail weld zone;
   a second cooler that cools a rail web portion of the rail weld zone; and
   a controller configured to control the first and second coolers, wherein:
   the first cooler comprises a first temperature detector configured to detect the head portion temperature, and a first cooling fluid ejector configured to eject a first cooling fluid to the head portion;
   the second cooler comprises a second temperature detector configured to detect the rail web portion temperature, and a second cooling fluid ejector configured to eject a second cooling fluid to the rail web portion; and
   the controller is configured to individually control kinds, flow rates, and flow velocities of the first and second cooling fluids during cooling of the head portion and the rail web portion.

2. The device according to claim 1, wherein the second cooling fluid ejector comprises a cooling width adjustor configured to adjust the second cooler to eject the second cooling fluid at a cooling width of the rail weld zone corresponding to an area in the range of 35% to 75% of the width of the rail weld zone in an axial direction of a rail.

3. The device according to claim 1 or 2, wherein:
   each of the first and second cooling fluid ejectors comprises at least two air ejection holes, gas-water ejection holes, and water ejection holes; and
   the kinds of the first and second cooling fluids, which are individually changed by the control section, include air, gas-water, and water.

4. A method of cooling a rail weld zone, the method comprising:
   separately cooling a head portion and a rail web portion of the rail weld zone;
   detecting a temperature of the head portion in a first temperature detecting process;
   detecting a temperature of the rail web portion in a second temperature detecting process;
   ejecting a first cooling fluid to the head portion in a first ejection process;
   ejecting a second cooling fluid to the rail web portion in a second ejection process; and
   individually changing kinds, flow rates, and flow velocities of the first and second cooling fluids while cooling the head portion and the rail web portion in a control process.

5. The method according to claim 4, further comprising, in the second ejection process, ejecting the second cooling fluid to an area corresponding to a width in the range of 35% to 75% of the width of the rail weld zone in an axial direction of a rail.

6. The method according to claim 4 or 5, wherein the first and second cooling fluids are selected from the group consisting of air, gas-water, and water.

7. The method according to claim 4, further comprising ejecting the second cooling fluid to the rail web portion in the second ejection process after the rail web portion is completely transformed to pearlite from an austenite temperature region.

8. The method according to claim 4, further comprising ejecting the second cooling fluid to the rail web portion in the second ejection process until the rail web portion is completely transformed to pearlite from an austenite temperature region.

9. The method according to claim 4, further comprising ejecting the second cooling fluid to the rail web portion in the second ejection process until the temperature of the rail web portion reaches about 200° C. after pearlite transformation is completed from a state where the rail web portion is in an austenite temperature region.

10. The method according to claim 4, further comprising ejecting the first cooling fluid to the head portion in the first ejection process until the head portion is completely transformed to pearlite from an austenite temperature region, and
   ejecting the second cooling fluid to the rail web portion in the second ejection process until the rail web portion is completely transformed to pearlite from an austenite temperature region and after the rail web portion is completely transformed to pearlite from an austenite temperature region.

* * * * *